United States Patent
Liu et al.

(10) Patent No.: US 8,605,384 B1
(45) Date of Patent: Dec. 10, 2013

(54) DISK DRIVE PERFORMING LIFETIME LOGGING OF MICROACTUATOR SENSITIVITY

(71) Applicant: Western Digital Technologies, Inc., Irvine, CA (US)

(72) Inventors: Yanning Liu, San Ramon, CA (US); Chuanwen Ji, Irvine, CA (US); Duc T. Phan, Saratoga, CA (US); Ming Ying Wang, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/670,388

(22) Filed: Nov. 6, 2012

(51) Int. Cl.
*G11B 5/596* (2006.01)

(52) U.S. Cl.
USPC ........................................................ 360/78.05

(58) Field of Classification Search
None
See application file for complete search history.

(56) References Cited

U.S. PATENT DOCUMENTS

| | | | |
|---|---|---|---|
| 5,654,841 A | 8/1997 | Hobson et al. | |
| 6,724,563 B2 * | 4/2004 | Kobayashi et al. | 360/78.05 |
| 6,741,417 B2 * | 5/2004 | Hsin et al. | 360/78.05 |
| 6,831,807 B2 * | 12/2004 | Koso et al. | 360/78.05 |
| 6,898,039 B2 * | 5/2005 | Kobayashi et al. | 360/78.09 |
| 7,009,804 B2 * | 3/2006 | Sharma et al. | 360/78.05 |
| 7,072,134 B1 * | 7/2006 | Hirano et al. | 360/55 |
| 7,075,748 B2 * | 7/2006 | White et al. | 360/78.05 |
| 7,079,338 B1 * | 7/2006 | Semba et al. | 360/75 |
| 7,079,339 B1 * | 7/2006 | Semba et al. | 360/75 |
| 7,106,552 B2 * | 9/2006 | Hirano et al. | 360/78.05 |
| 7,136,257 B2 * | 11/2006 | Zhang et al. | 360/78.05 |
| 7,283,321 B1 | 10/2007 | Sun et al. | |
| 7,342,740 B1 * | 3/2008 | Lee et al. | 360/78.05 |
| 7,423,837 B2 | 9/2008 | Hutsell | |
| 7,538,971 B2 | 5/2009 | Sun et al. | |
| 7,576,940 B2 * | 8/2009 | Lee et al. | 360/77.02 |
| 7,626,782 B1 | 12/2009 | Yu et al. | |
| 8,335,049 B1 * | 12/2012 | Liu et al. | 360/78.05 |
| 8,467,144 B2 * | 6/2013 | Lim et al. | 360/78.05 |
| 2006/0109585 A1 * | 5/2006 | Lee et al. | 360/77.02 |

* cited by examiner

*Primary Examiner* — Hoa T Nguyen
*Assistant Examiner* — James L Habermehl

(57) ABSTRACT

A disk drive is disclosed comprising a head, a disk surface, and a voice coil motor (VCM) and a microactuator operable to actuate the head over the disk surface. A sensitivity of the microactuator is periodically measured over a lifetime of the microactuator. Each measured sensitivity is stored in a timeline log, wherein the timeline log represents a degradation curve of the microactuator over the lifetime of the microactuator.

24 Claims, 4 Drawing Sheets

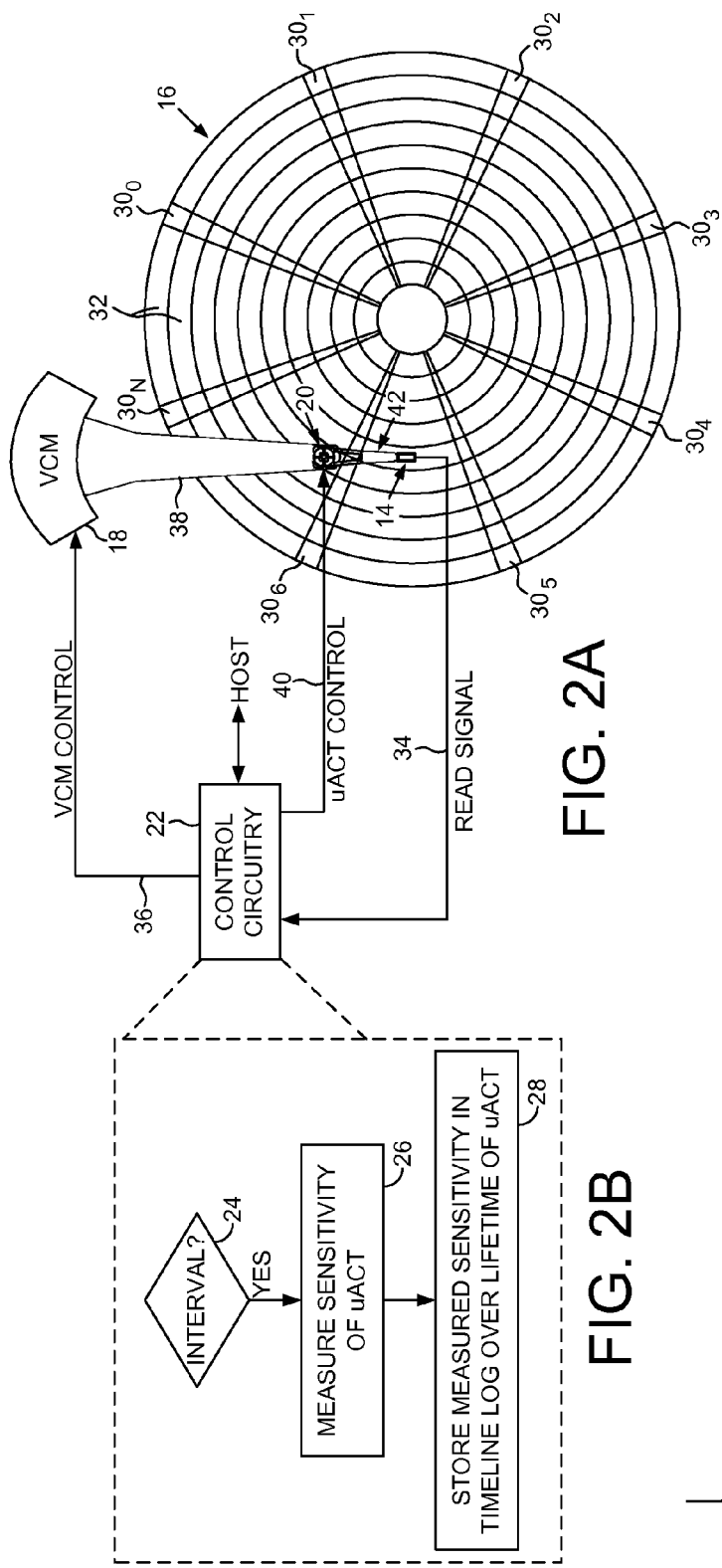
FIG. 2A
FIG. 2B
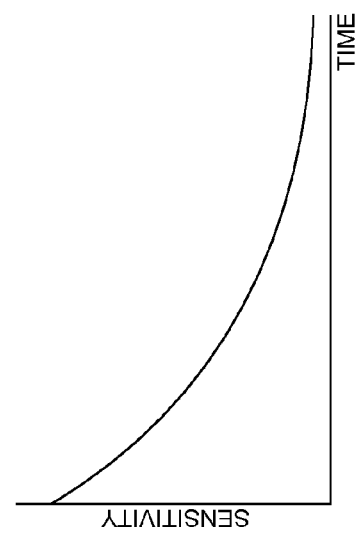
FIG. 2C

DISK DRIVE PERFORMING LIFETIME LOGGING OF MICROACTUATOR SENSITIVITY

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

FIG. 1 shows a prior art disk format 1 as comprising a number of servo tracks 3 defined by servo sectors $5_0$-$5_N$ recorded around the circumference of each servo track, wherein a plurality of data tracks are defined relative to the servo tracks. Each servo sector 5, comprises a preamble 7 for storing a periodic pattern, which allows proper gain adjustment and timing synchronization of the read signal, and a sync mark 9 for storing a special pattern used to symbol synchronize to a servo data field 11. The servo data field 11 stores coarse head positioning information, such as a servo track address, used to position the head over a target data track during a seek operation. Each servo sector 5, further comprises groups of servo bursts 13, which are recorded with precise intervals and offsets relative to the servo track centerlines. The servo bursts 13 provide fine head position information used for centerline tracking while accessing a data track during write/read operations.

As the density of the data tracks increases, a microactuator may be employed in combination with the VCM to improve the tracking performance of the servo system. Any suitable microactuator may be employed, such as a suitable piezoelectric (PZT) actuator. The microactuator may actuate the head over the disk in any suitable manner, such as by actuating a suspension relative to a distal end of an actuator arm, or by actuating a slider relative to the suspension.

BRIEF DESCRIPTION OF THE DRAWINGS

FIG. 2A shows a disk drive according to an embodiment of the present invention comprising a head actuated over a disk by a voice coil motor (VCM) and a microactuator.

FIG. 2B is a flow diagram according to an embodiment of the present invention wherein a sensitivity of the microactuator is periodically measured over a lifetime of the microactuator and stored in a timeline log.

FIG. 2C shows an embodiment of the present invention wherein the timeline log of the measured sensitivities represents a degradation curve of the microactuator over the lifetime of the microactuator.

DETAILED DESCRIPTION

Figure 1:
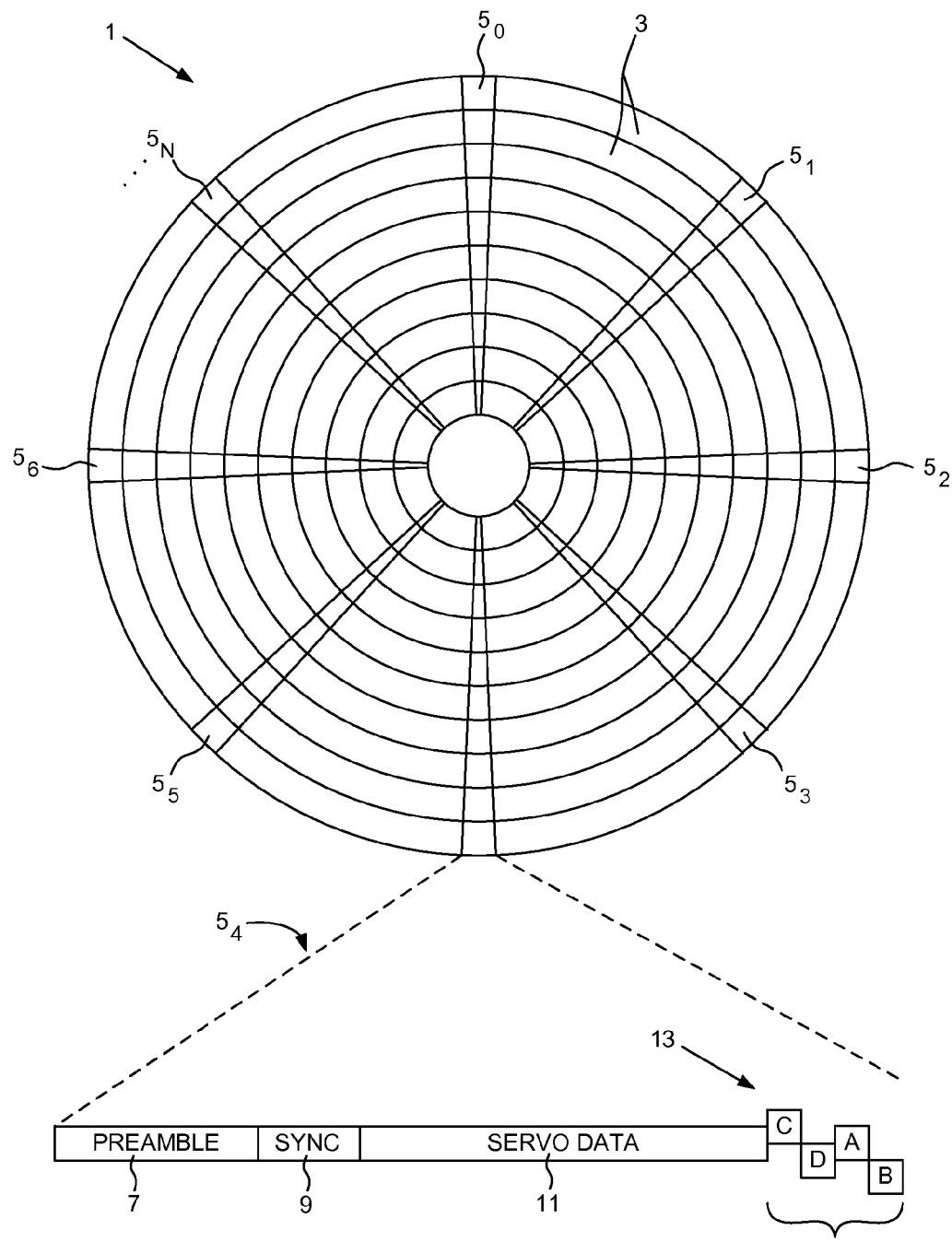
FIG. 1 shows a prior art disk format comprising a plurality of servo tracks defined by servo sectors.

FIG. 2A shows a disk drive according to an embodiment of the present invention comprising a head 14, a disk surface 16, and a voice coil motor (VCM) 18 and a microactuator 20 operable to actuate the head 14 over the disk surface 16. The disk drive further comprises control circuitry 22 operable to execute the flow diagram of FIG. 2B, wherein a sensitivity of the microactuator is periodically measured (block 24) over a lifetime of the microactuator (block 26). Each measured sensitivity is stored in a timeline log (block 28), wherein the timeline log represents a degradation curve of the microactuator over the lifetime of the microactuator (an example of which is shown in FIG. 2C).

In the embodiment of FIG. 2A, the disk surface 16 comprises embedded servo sectors $30_0$-$30_N$ that define a plurality of servo tracks 32, wherein data tracks are defined relative to the servo tracks (at the same or different radial density). The control circuitry 22 process a read signal 34 emanating from the head 14 to demodulate the servo sectors $30_0$-$30_N$ into an estimated position. The estimated position is subtracted from a reference position to generate the position error signal (PES) representing an error between the actual position of the head and a target position relative to a target track. The PES is filtered by a VCM compensator to generate a first control signal 36 applied to the VCM 18 which rotates an actuator arm 38 about a pivot. The PES is also filtered by a microactuator compensator to generate a second control signal 40 applied to the microactuator 20 which actuates a suspension 42 relative to the actuator arm 38.

The servo sectors $30_0$-$30_N$ may comprise any suitable position information, such as a track address for coarse positioning and servo bursts for fine positioning. The servo bursts may also comprise any suitable pattern, such as an amplitude-based servo pattern (e.g., the quadrature servo pattern shown in FIG. 1), or a suitable phase-based servo pattern.

Any suitable microactuator 20 may be employed in the embodiments of the present invention, such as a suitable piezoelectric microactuator. Further, the microactuator 20 may actuate the head 14 over the disk surface 16 in any suitable manner, such as by actuating the suspension 42 relative to the actuator arm 38 as in FIG. 2A, or by actuating a slider relative to the suspension 42. Regardless as to the type of microactuator employed, or how the microactuator actuates the head 14 over the disk surface 16, the sensitivity of the microactuator typically degrades over time. That is, the displacement of the microactuator 20 versus a unit measure of the control signal 40 applied to the microactuator will typically decrease over time. In one embodiment, a gain of the microactuator may be recalibrated (e.g., by increasing the gain of an amplifier) in order to maintain a target sensitivity of the microactuator. However as the microactuator 20 continues to degrade over its lifetime, the gain adjustment will eventually saturate. Once the gain adjustment saturates, any further degradation of the microactuator will limit its maximum stroke which degrades performance of the servo system until the microactuator eventually fails altogether.

In the embodiments of the present invention, periodically measuring and storing the sensitivity of the microactuator in a timeline log provides a number of advantages. In one embodiment, the timeline logs from a number of disk drives can be analyzed by the manufacturer in order to evaluate and characterize the nominal performance of a particular type of microactuator, such as a microactuator supplied by a particular vendor. This information can be used to correct manufacturing defects, or to relax manufacturing tolerances if the microactuator is over-performing, thereby decreasing the manufacturing cost. Conversely if the microactuator is under-performing, the manufacturing tolerances may be tightened to improve the longevity of the disk drives. In other embodiments described in greater detail below, the timeline log of each individual disk drive may be used to recalibrate the gain of the microactuator system (microactuator plus control circuitry) when its sensitivity falls below a threshold, or to predict performance degradation of the microactuator over time, or to predict when the microactuator may fail altogether. Each disk drive may then provide a warning to a customer regarding the predicted timeline for performance degradation and/or failure of the microactuator.

Figure 3A:
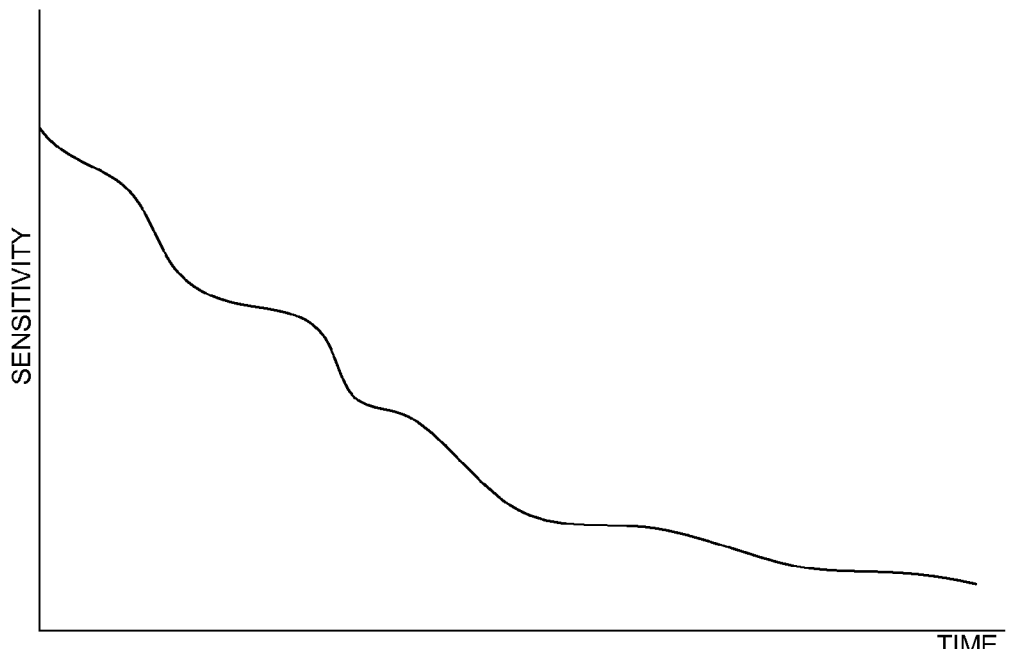
FIGS. 3A and 3B show an embodiment of the present invention wherein the degradation curve of the microactuator may be affected by the temperature, and therefore in one embodiment the temperature is measured and stored together with the measured sensitivity in the timeline log.
Figure 3B:
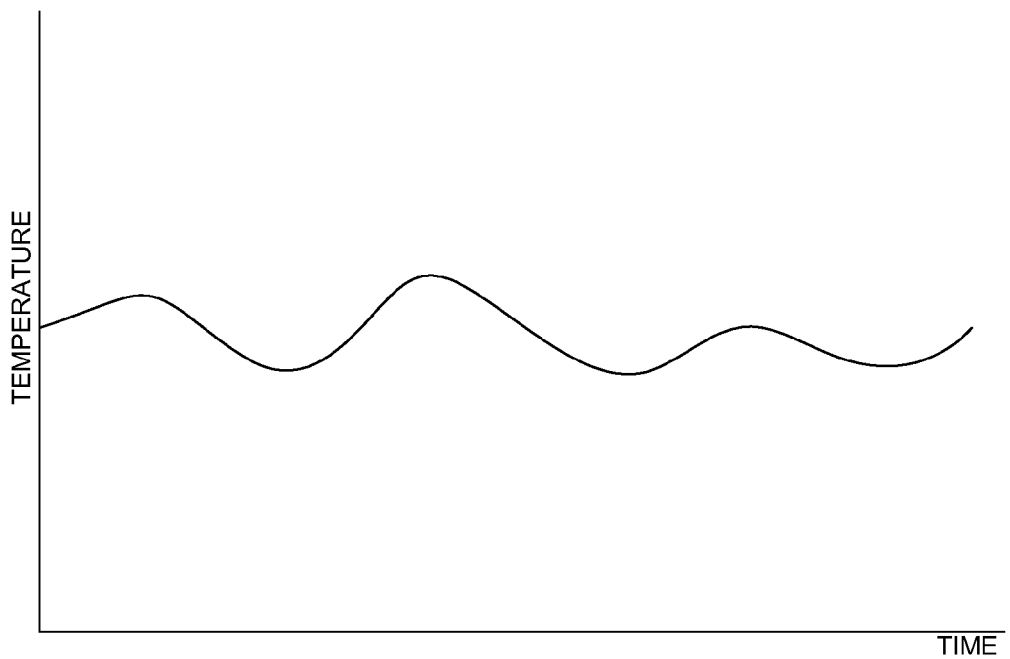

In one embodiment, the sensitivity degradation of the microactuator is affected by the ambient temperature of the disk drive; for example, the microactuator may degrade faster at higher temperatures. The temperature will therefore affect the shape of the degradation curve represented by the timeline log of sensitivity measurements as illustrated in FIGS. 3A and 3B. Accordingly, in one embodiment each time the sensitivity of the microactuator is measured, the temperature is also measured and stored in the timeline log. In one embodiment, a manufacturer of disk drives may evaluate both the sensitivity measurements together with the temperature measurements to gain a better understanding of the performance and degradation characteristics of the microactuator over time. In addition in an embodiment disclosed in greater detail below, the temperature measurements may be used to extrapolate the degradation curve so as to better predict performance degradation and/or predict failure of the microactuator.

Figure 4:
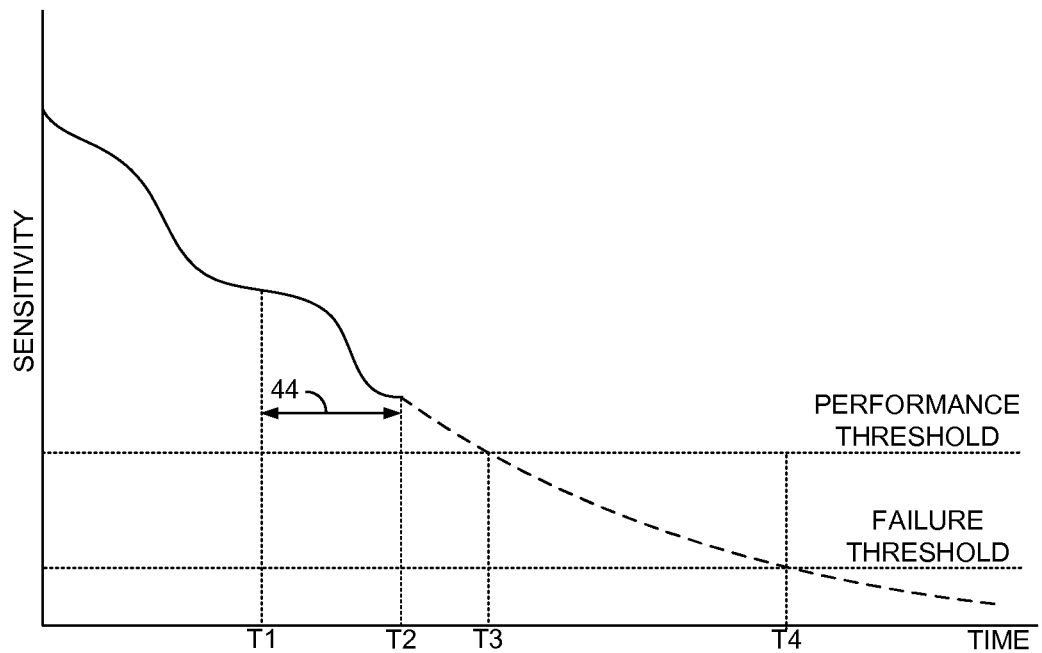
FIG. 4 shows an embodiment of the present invention wherein the degradation curve is extrapolated over a window of the timeline log spanning at least two months in order to determine when to recalibrate a gain of the microactuator, to predict future performance degradation, or to predict future failure.

FIG. 4 shows an example degradation curve corresponding to a timeline log of sensitivity measurements for a microactuator in a disk drive up to a particular time T2. In one embodiment, the control circuitry 22 within the disk drive extrapolates the degradation curve in order to predict certain performance characteristics of the microactuator. In the example shown in FIG. 4, the control circuitry may extrapolate the degradation curve in order to predict that the sensitivity of the microactuator will fall below a predetermined performance threshold at time T3. Accordingly, at time T3 (or before T3) the control circuitry 22 may recalibrate a gain of the microactuator system such as by increasing the gain of an amplifier, thereby compensating for the microactuator gain reduction and resetting the sensitivity of the microactuator system.

In one embodiment, the gain of the microactuator will eventually degrade to the point where it cannot be completely compensated by increasing the amplifier gain. When this happens, the sensitivity of the microactuator system will continue to degrade toward the performance threshold at time T3 in FIG. 4, and then further degrade until reaching a failure threshold at time T4. In one embodiment, the control circuitry 22 may provide a customer with a predicted timeline of performance degradation (starting at time T3 and ending with failure at time T4) so that the customer may take appropriate action. For example, the customer may evaluate the predicted performance data received form each disk drive in order to schedule certain maintenance operations, such as swapping out older disk drives with newer disk drives. The customer may also repurpose older disk drives that have reached the performance threshold in FIG. 4, such as by converting the disk drives into cold (i.e., archive) disk drives that are infrequently written or read only. Eventually the microactuator in a repurposed disk drive will fail (at time T4 in FIG. 4), wherein the disk drive may be reformatted with a lower track density rather than discarded. That is, a disk drive reformatted with a lower track density may still be functional if accessed using the VCM 18 alone after disabling the microactuator servo loop.

In one embodiment, the control circuitry 22 extrapolates the degradation curve starting from the beginning of the timeline log (or from the time the gain of the microactuator is recalibrated). In another embodiment, the control circuitry 22 may extrapolate the degradation curve over a window 44 of the timeline log spanning at least two months as shown in FIG. 4. Extrapolating over a window 44 of the timeline log may help account for changes in the degradation curve due to changes in temperature over the life of the disk drive. The temperature of the disk drive will typically remain fairly constant over at least a two month window, and therefore the sensitivity measurements over this window will typically provide a sufficiently accurate extrapolated degradation curve. In either embodiment, the sensitivity of the microactuator will typically degrade very slowly over the life of the disk drive, and therefore extrapolating the sensitivity measurements over a long window of time (e.g., at least two months, several months, or even years) provides a more accurate degradation estimate. Consequently the decision to recalibrate the gain of the microactuator becomes more accurate, thereby reducing the number of recalibrations executed by maximizing the recalibration interval. A more accurate degradation estimate also improves the extrapolated degradation curve used to predict performance and failure characteristics of the microactuator, thereby enabling longer use before repurposing, reformatting, or discarding the disk drives.

Figure 5:
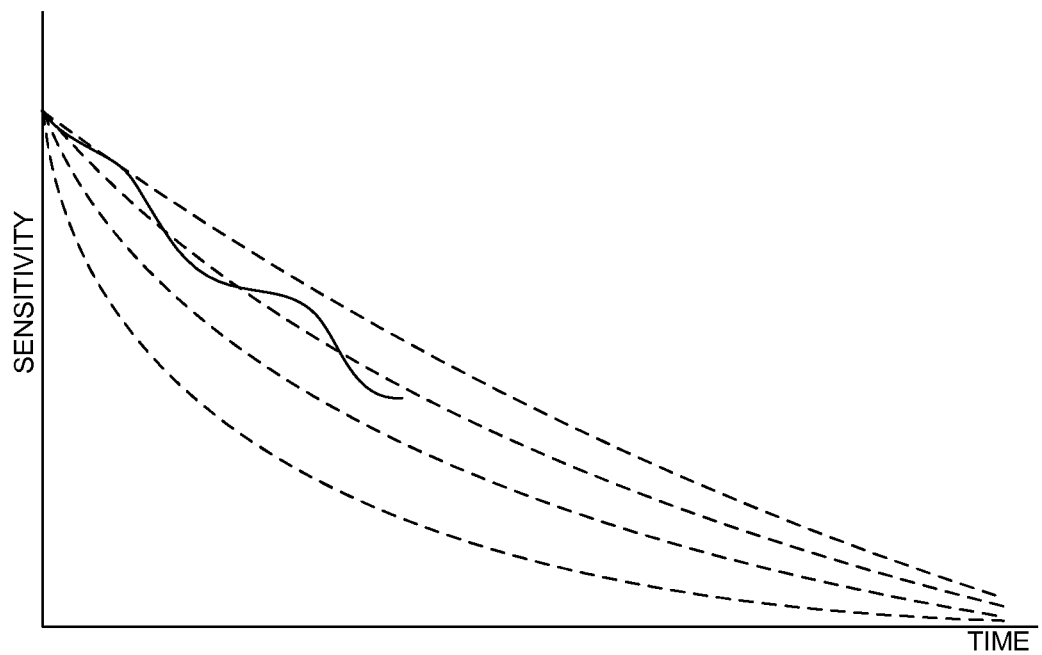
FIG. 5 shows an embodiment of the present invention wherein the degradation curve is extrapolated by curve fitting the measured sensitivities to a pre-characterized degradation curve.

In one embodiment illustrated in FIG. 5, a number of degradation curves may be pre-characterized for the microactuator, such as by testing a number of the microactuators or through theoretical computations based on known tolerances of the microactuator. In addition, the pre-characterized degradation curves may be updated over time using the timeline logs extracted from a number of disk drives that are (or were) deployed in the field. Each degradation curve shown in FIG. 5 may correspond to a typical degradation of the microactuator under certain operating characteristics, such as variations in the materials or geometry of the microactuator. The pre-characterized degradation curves may be stored in each disk drive during manufacturing and used by the control circuitry 22 to extrapolate the degradation curve as described above by curve fitting the sensitivity measurements to the closest pre-characterized degradation curve. In one embodiment, the control circuitry 22 may curve fit the sensitivity measurements that span the predetermined window 44 shown in FIG. 4 in order to account for changes in temperature over time.

In one embodiment, a plurality of sets of degradation curves may be pre-characterized, where each set corresponds to a particular temperature. In other words, the degradation of the microactuator may vary due to manufacturing tolerances thereby resulting in a corresponding set of degradation curves, wherein the shape of these degradation curves will also vary based on the temperature. In one embodiment the control circuitry 22 may select the set of pre-characterized degradation curves to perform the curve fitting operation based on the average temperature measurement over the predetermined window 44 of the timeline log. In one embodiment, the sets of pre-characterized degradation curves may be updated by the manufacturer over time using the timeline log information (including temperature measurements) extracted from disk drives that are (or were) deployed in the field.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a head;
a disk surface;
a voice coil motor (VCM) and a microactuator operable to actuate the head over the disk surface; and
control circuitry operable to:
periodically measure a sensitivity of the microactuator over a lifetime of the microactuator; and
store each measured sensitivity in a timeline log, wherein the timeline log represents a degradation curve of the microactuator over the lifetime of the microactuator.

2. The disk drive as recited in claim 1, wherein the control circuitry is further operable to:
measure a temperature when measuring the sensitivity of the microactuator; and
store each measured temperature in the timeline log, wherein the timeline log represents a degradation curve of the microactuator versus temperature over the lifetime of the microactuator.

3. The disk drive as recited in claim 2, wherein the control circuitry is further operable to:
extrapolate the degradation curve over a window of the timeline log spanning at least two months; and
predict at least one of a performance degradation and a failure of the microactuator based on the extrapolated degradation curve.

4. The disk drive as recited in claim 3, wherein the control circuitry is further operable to extrapolate the degradation curve by curve fitting the measured sensitivities to a pre-characterized degradation curve.

5. The disk drive as recited in claim 4, wherein the control circuitry is further operable to curve fit the degradation curve to the pre-characterized degradation curve based on the measured temperatures.

6. The disk drive as recited in claim 2, wherein the control circuitry is further operable to:
extrapolate the degradation curve over a window of the timeline log spanning at least two months; and
recalibrate a gain of the microactuator based on the extrapolated degradation curve.

7. The disk drive as recited in claim 6, wherein the control circuitry is further operable to extrapolate the degradation by curve fitting the measured sensitivities to a pre-characterized degradation curve.

8. The disk drive as recited in claim 7, wherein the control circuitry is further operable to curve fit the measured sensitivities to the pre-characterized degradation curve based on the measured temperatures.

9. The disk drive as recited in claim 1, wherein the control circuitry is further operable to:
extrapolate the degradation curve over a window of the timeline log spanning at least two months; and
predict a performance degradation of the microactuator based on the extrapolated degradation curve.

10. The disk drive as recited in claim 9, wherein the control circuitry is further operable to extrapolate the degradation curve by curve fitting the measured sensitivities to a pre-characterized degradation curve.

11. The disk drive as recited in claim 1, wherein the control circuitry is further operable to:
extrapolate the degradation curve over a window of the timeline log spanning at least two months; and
predict a failure interval that the microactuator is expected to fail based on the extrapolated degradation curve.

12. The disk drive as recited in claim 11, wherein the control circuitry is further operable to extrapolate the degradation curve by curve fitting the measured sensitivities to a pre-characterized degradation curve.

13. A method of operating a disk drive, the disk drive comprising a head, a disk surface, and a voice coil motor (VCM) and a microactuator operable to actuate the head over the disk surface, the method comprising:
periodically measuring a sensitivity of the microactuator over a lifetime of the microactuator; and
storing each measured sensitivity in a timeline log, wherein the timeline log represents a degradation curve of the microactuator over the lifetime of the microactuator.

14. The method as recited in claim 13, further comprising:
measuring a temperature when measuring the sensitivity of the microactuator; and
storing each measured temperature in the timeline log, wherein the timeline log represents a degradation curve of the microactuator versus temperature over the lifetime of the microactuator.

15. The method as recited in claim 14, further comprising:
extrapolating the degradation curve over a window of the timeline log spanning at least two months; and
predicting at least one of a performance degradation and a failure of the microactuator based on the extrapolated degradation curve.

16. The method as recited in claim 15, wherein extrapolating the degradation comprises curve fitting the measured sensitivities to a pre-characterized degradation curve.

17. The method as recited in claim 16, further comprising curve fitting the measured sensitivities to the pre-characterized degradation curve based on the measured temperatures.

18. The method as recited in claim 14, further comprising:
extrapolating the degradation curve over a window of the timeline log spanning at least two months; and
recalibrating a gain of the microactuator based on the extrapolated degradation curve.

19. The method as recited in claim 18, wherein extrapolating the degradation curve comprises curve fitting the measured sensitivities to a pre-characterized degradation curve.

20. The method as recited in claim 19, further comprising curve fitting the measured sensitivities to the pre-characterized degradation curve based on the measured temperatures.

21. The method as recited in claim 13, further comprising:
    extrapolating the degradation curve over a window of the timeline log spanning at least two months; and
    predicting a performance degradation of the microactuator based on the extrapolated degradation curve.

22. The method as recited in claim 21, wherein extrapolating the degradation curve comprises fitting the measured sensitivities to a pre-characterized degradation curve.

23. The method as recited in claim 13, further comprising:
    extrapolating the degradation curve over a window of the timeline log spanning at least two months; and
    predicting a failure interval that the microactuator is expected to fail based on the extrapolated degradation curve.

24. The method as recited in claim 23, wherein extrapolating the degradation curve comprises curve fitting the measured sensitivities to a pre-characterized degradation curve.

* * * * *